United States Patent
Sibbald

(10) Patent No.: US 10,467,197 B2
(45) Date of Patent: Nov. 5, 2019

(54) CREATING A UNIVERSALLY DEDUPLICATABLE ARCHIVE VOLUME

(71) Applicant: BACULA SYSTEMS SA, Yverdon-les-Bains (CH)

(72) Inventor: Kern Sibbald, Pully (CH)

(73) Assignee: BACULA SYSTEMS SA, Yverdon-les-Bains (CN)

( * ) Notice: Subject to any disclaimer, the term of this patent is extended or adjusted under 35 U.S.C. 154(b) by 602 days.

(21) Appl. No.: 14/783,438

(22) PCT Filed: Feb. 19, 2014

(86) PCT No.: PCT/IB2014/059095
§ 371 (c)(1),
(2) Date: Oct. 9, 2015

(87) PCT Pub. No.: WO2014/174380
PCT Pub. Date: Oct. 30, 2014

(65) Prior Publication Data
US 2016/0055169 A1  Feb. 25, 2016

(30) Foreign Application Priority Data
Apr. 22, 2013 (CH) .................................... 00809/13

(51) Int. Cl.
*G06F 16/10* (2019.01)
*G06F 16/174* (2019.01)
(Continued)

(52) U.S. Cl.
CPC ........ *G06F 16/1748* (2019.01); *G06F 16/113* (2019.01); *G06F 16/182* (2019.01)

(58) Field of Classification Search
CPC ......... G06F 17/30156; G06F 17/30073; G06F 17/30194; G06F 16/1748; G06F 16/182; G06F 16/113
See application file for complete search history.

(56) References Cited

U.S. PATENT DOCUMENTS 5,341,251 A * 8/1994 Fincher .............. G11B 15/1808
360/49
5,517,599 A * 5/1996 Shih ..................... G11B 5/0086
360/72.2
(Continued)

FOREIGN PATENT DOCUMENTS

| EP | 1 975 798 | 10/2008 |
|---|---|---|
| GB | 2 467 239 | 7/2010 |
| WO | 2010/033961 | 3/2010 |

OTHER PUBLICATIONS

Upadhyay et al.; Deduplication and compression techniques in cloud design, Systems Conference (SysCon), 2012 IEEE International, Mar. 19, 2012 IEEE, p. 1-6, Mar. 19, 2012, ISBN 978-1A673-0748-2; ISBN 1-4673-07 48-3, doi: 10.1109/SysCon .2012. 61894 72, [XP032171927].

(Continued)

*Primary Examiner* — Joshua Bullock
*Assistant Examiner* — Tiffany Thuy Bui
(74) *Attorney, Agent, or Firm* — Andre Roland S.A.; Nikolaus Schibli

(57) ABSTRACT

A method for creating a volume that contains data from an original stream of multiple files, and which can be optimally deduplicated by an underlying deduplication storage system. The method comprises receiving data records representing metadata and file data, at least a part of which are already separated, separating the metadata and the file data into a first file and a second file, the first file and the second file being paired, the first file called Metadata Volume containing metadata, header data and references to the file data, and the second file called Aligned Volume containing file data only. A further part of the records which contain both metadata and file data are separated into metadata and file (Continued)

data and then subjected to the step of separating the metadata and the file data into the first file and the second file.

17 Claims, 7 Drawing Sheets

(51) Int. Cl.
*G06F 16/11* (2019.01)
*G06F 16/182* (2019.01)

(56) References Cited

U.S. PATENT DOCUMENTS

| | | | |
|---|---|---|---|
| 8,055,618 B2 | 11/2011 | Anglin | |
| 8,055,681 B2 | 11/2011 | Anglin et al. | |
| 2003/0204670 A1* | 10/2003 | Holt | G06F 3/0601 711/112 |
| 2005/0234847 A1* | 10/2005 | Damien | G06F 3/0613 |
| 2008/0209154 A1* | 8/2008 | Schneider | G06F 12/023 711/170 |
| 2009/0171888 A1 | 7/2009 | Anglin | |
| 2009/0182789 A1 | 7/2009 | Sandorfi et al. | |
| 2009/0192789 A1 | 7/2009 | Lee et al. | |
| 2009/0228744 A1* | 9/2009 | Deenadhayalan | G06F 11/1004 714/48 |
| 2009/0327625 A1 | 12/2009 | Jaquette et al. | |
| 2010/0077013 A1* | 3/2010 | Clements | G06F 17/30156 707/822 |
| 2010/0131561 A1* | 5/2010 | Lin | G11B 27/329 707/791 |
| 2010/0332401 A1 | 12/2010 | Prahlad et al. | |
| 2011/0295914 A1 | 12/2011 | Mori | |
| 2012/0030265 A1* | 2/2012 | Anderson | G06F 16/1858 707/830 |
| 2012/0008426 A1 | 4/2012 | Vijayan et al. | |
| 2012/0084269 A1 | 4/2012 | Vijayan et al. | |
| 2012/0311294 A1 | 12/2012 | Noguchi | |
| 2013/0046733 A1 | 2/2013 | Sakuraba | |
| 2018/0025025 A1* | 1/2018 | Davis | G06F 17/30203 |

OTHER PUBLICATIONS

Search Report of the Swiss Federal Institute of Intellectual Property for Application CH00809/13, dated Jul. 23, 2013.

* cited by examiner

Method Overview

Write Aligned Data

Write Buffer to Aligned Volume

Empty Disk Filesystem

Filesystem with files

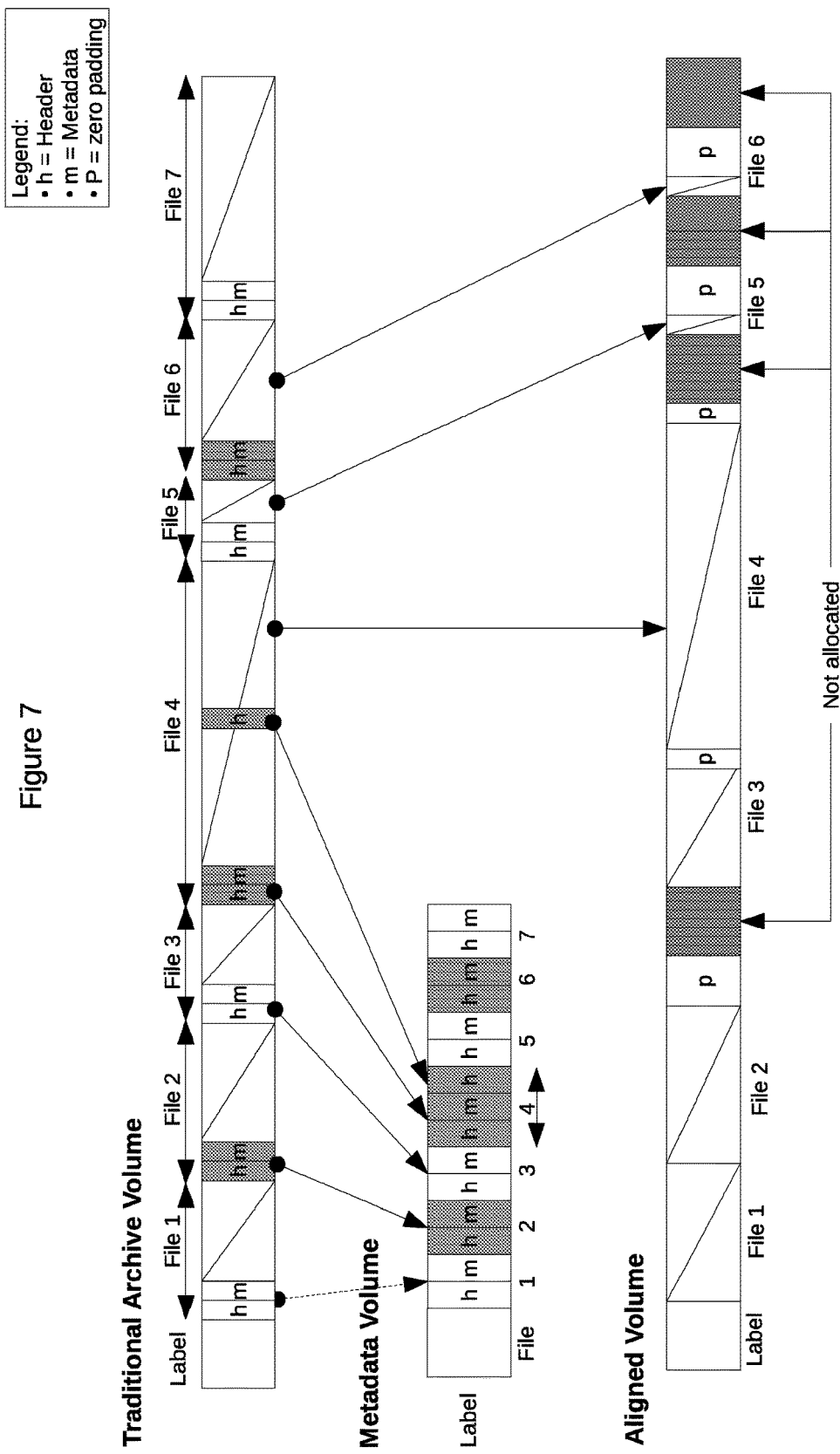

CREATING A UNIVERSALLY DEDUPLICATABLE ARCHIVE VOLUME

TECHNICAL FIELD

The invention relates to an archive volume (file) format.

BACKGROUND OF THE INVENTION

One of the most researched fields in information technology today is deduplication. Deduplication may be defined as removing duplicate copies of the same data (usually blocks or chunks of data) and replacing them with a reference (pointer) to a single copy of the data. A common example of this is an email that is sent to 100 people in an organization and thus gets stored on disk 100 times. The amount of redundant information can be very large if the email contains a large document.

Most archive programs stream the metadata, headers, and file data to a single file compacting and mixing them together thus making deduplication of such an archive file difficult for any deduplicating storage service (appliance, OS filesystem, storage system, . . . ) because the archive data will be in small chunks interspersed with metadata and header data which makes the file unique and difficult to deduplicate.

To resolve the problem of poor deduplication of archive volume formats, archive application vendors often incorporate deduplication algorithms directly in the archive program to permit storing the data that has been deduplicated during the archive process. This requires each vendor to develop and implement their own deduplication methods.

At the same time, more and more filesystems and storage systems have deduplication technology built-in so that the user's data is directly deduplicated when it is stored in a file, whether or not it is processed by an archive program. Thus vendors with built-in deduplication algorithms create inefficiencies by trying to deduplicate a second time or by requiring the Operating System to reconstruct the original non-deduplicated data only for it to be deduplicated again in the archive process.

Most deduplication research (patents) today provide methods to improve the speed and efficiency of deduplicating data. The invention herein described teaches creating a universal archive volume that may be subsequently optimally deduplicated by existing and future deduplication methods developed for filesystems, for storage systems, and by third parties. User settable options permit optimally tuning the archive volume for most efficient deduplication.

When an archive program creates an archive image (called a volume), this image contains many files, and each file has metadata (time, date, permissions, . . . ), headers, and other data interspersed with the actual file data. In fact, the file data is generally broken into small chunks (65K bytes) for transmission from the client machine to the storage machine and is then compacted into the archive image (volume) with additional header data that permit reconstructing the original file that was backed up. This means that the original file that could be easily deduplicated is now stored in smaller chunks interspersed with archive information, and thus the traditional archive volume, represented in the bar labeled traditional archive volume of FIG. 7, becomes unique and does not deduplicate well using existing deduplication algorithms.

Some storage systems have now included deduplication technology that recognizes vendor specific archive formats and separates or filters the vendor's metadata and header data so that the actual file data can be deduplicated. One problem with such methods is that they must be adapted differently for each vendor's archive format, and if a vendor makes the slightest change in their archive format, the deduplication will no longer work or at best will require new or additional vendor specific changes in the deduplication algorithms.

The following are patent publications that describe technology related to the technical field of the invention:

1. U.S. Pat. No. 8,055,618 B2 Nov. 8, 2011, Anglin, Data Deduplication By Separating Data From Meta Data;

2. U.S. 2012/0084269 A1, Apr. 5, 2012, Vijayan et al., CONTENT ALIGNED BLOCK-BASED DEDUPLICATION;

3. U.S. 2009/0182789 A1, Jul. 16, 2009, Sandorfi et al., Scalable De-Duplication Mechanism.

The invention described herein attempts to leverage on the fact that filesystems and storage systems already have built-in deduplication and exploits this by creating an archive volume format that can be easily and optimally deduplicated by any deduplication algorithm and without vendor specific filters.

SUMMARY OF THE INVENTION

The invention herein described produces a Universal Deduplication Volume where archive data is efficiently stored permitting any deduplicating storage device to deduplicate the file data in the most optimal manner. It takes advantage of having a separate deduplicating filesystem or storage device on which or in which the Universal Deduplication Volume is stored.

In a first aspect, the invention provides a method for creating a volume that contains data from an original stream of multiple files, and which can be optimally deduplicated by an underlying deduplication storage system. The method comprises receiving data records representing metadata and file data, at least a part of which are already separated, and separating the metadata and the file data into a first file and a second file, the first file and the second file being paired, the first file called Metadata Volume containing metadata, header data and references to the file data, and the second file called Aligned Volume containing file data only. A further part of the records which contain both metadata and file data are separated into metadata and file data and then subjected to the step of separating the metadata and the file data into the first file and the second file.

In a first preferred embodiment, the method further comprises aligning a beginning of each original file of file data in the Aligned Volume at a block file boundary as set by a User Option that corresponds to the underlying deduplication storage system.

In a second preferred embodiment, the method further comprises leaving empty space between an end of each one of the original files of file data and the beginning of a subsequent original file of file data, thereby obtaining holes in the Aligned Volume, the holes not using disk space.

In a third preferred embodiment, the method further comprises writing the file data in the Aligned Volume in block sizes as set by a User Option corresponding to the underlying duplication storage system.

In a fourth preferred embodiment, the method further comprises padding incomplete blocks, which occur at an end of an original file of file data with zeros as set by a User Option that corresponds to the underlying deduplication storage system.

In a fifth preferred embodiment, the method further comprises placing small files as determined by a User Option in the Metadata Volume.

In a sixth preferred embodiment, the method further comprises pairing the Metadata Volume and the Aligned Volume such to obtain a logically same single archive volume.

In a seventh preferred embodiment, the method further comprises writing the metadata into the Aligned Volume with the same alignment as an original file and providing references to any subsequent metadata, thereby enabling use of a single volume.

In an eighth preferred embodiment, the method further comprises providing a User Option corresponding to a location where the Metadata Volume is created.

In an ninth preferred embodiment, the method further comprises providing a User Option corresponding to a location where the Aligned Volume is created.

In a second aspect, the invention provides a method for obtaining an original stream of multiple files from a volume as obtained with the method for creating a volume that contains data from an original stream of multiple files as described herein above. The method comprises reconstructing the original stream or records by reading the Metadata Volume and returning metadata when metadata is encountered; and reading and returning the stream or record from the Aligned Volume when a reference is found.

In a third aspect, the invention provides a system comprising hardware logic that implements the method for creating a volume that contains data from an original stream of multiple files as described herein above.

In a fourth aspect, the invention provides a system comprising software logic that implements the method for creating a volume that contains data from an original stream of multiple files as described herein above.

In a fifth aspect, the invention provides a system comprising hardware and software logic that implements the method for creating a volume that contains data from an original stream of multiple files as described herein above.

The author has observed that the alignment and methods used to create the universal deduplication volume (aligned data) are crucial to obtaining good deduplication results. If the aligned data file is simply a stream of bytes with little or no alignment and with no consideration for characteristics of the underlying deduplication engine, the data will not be efficiently or optimally deduplicated. Whereas if the data is carefully positioned in the aligned data volume according to the methods described herein the deduplication results will be excellent.

BRIEF DESCRIPTION OF THE DRAWINGS

The invention can be better understood in view of the description of preferred embodiments and in light of the figures, wherein

FIG. 7 shows a Traditional Archive Volume, Metadata Volume and Aligned Volume.

DETAILED DESCRIPTION OF PREFERRED EMBODIMENTS

Figure 1:
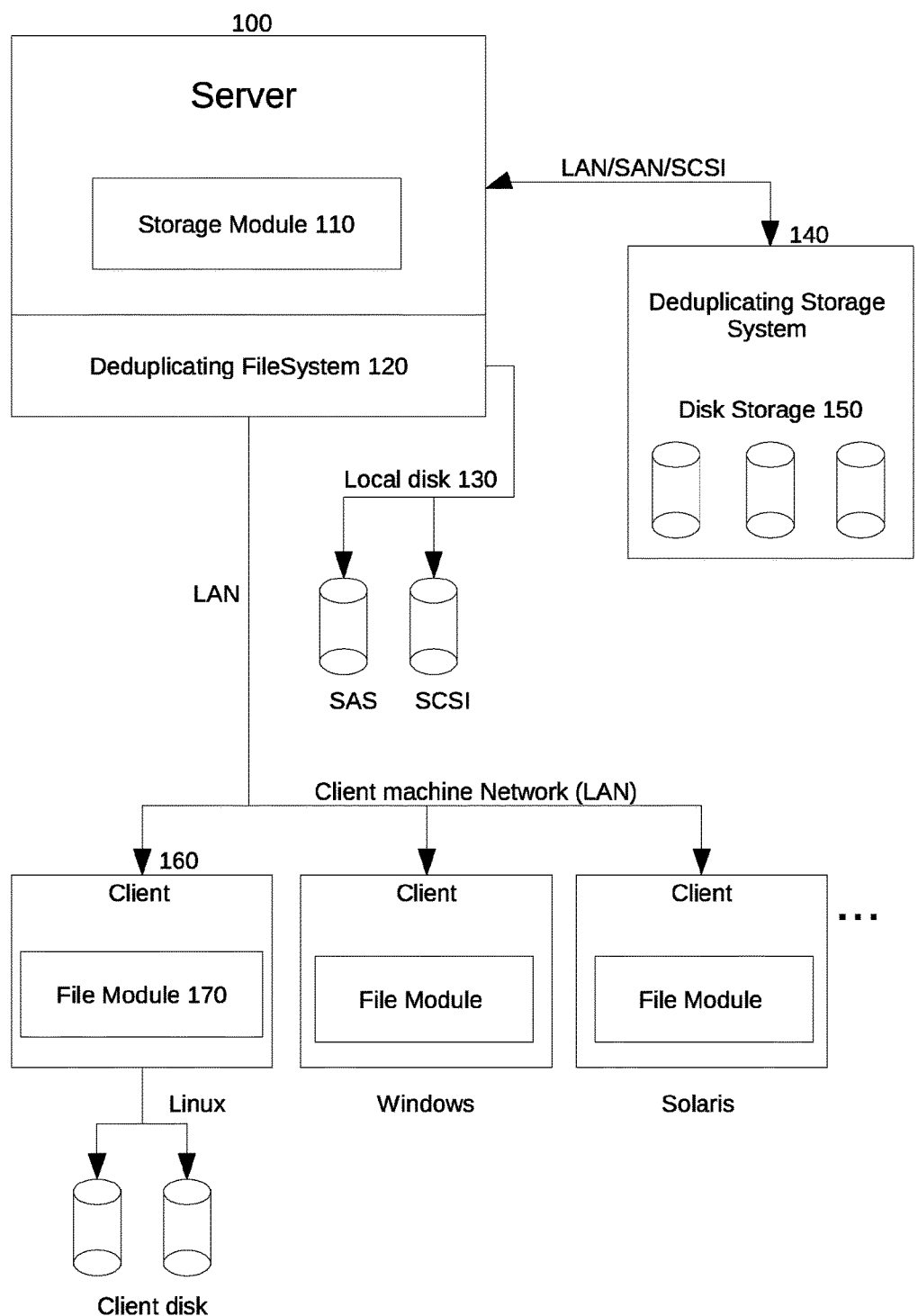
FIG. 1 illustrates in a block diagram form an example computing environment in which the method and the system according to the invention function.

Definitions:
1. Byte: refers to an 8 bit quantity of information stored in a computer memory or on file that is usually directly addressable by the computer hardware.
2. Block: a series of contiguous bytes that are normally some multiple of a power of two such as 256, 512, 1024, . . . Generally a block refers to data that is ultimately written to disk or tape.
3. Chunk: a series of contiguous bytes that may be of any size.
4. Record: a series of contiguous bytes similar to a chunk that is usually a smaller part of what can be put into a block. A record is generally accompanied by header data (see below).
5. File: an ordered series of bytes that contain data and are managed by an Operating System and generally have associated metadata such as a file name and permissions. A file is generally stored on a disk. Note that multiple files from multiple client machines are sorted in a single archive file, which is why here we refer to archive volumes rather than archive files.
6. Archive[1]: a file that contains a number of other files and their metadata typically for performing a backup of a multitude of files or for long term storage (archival) of a multitude of files.
7. Volume:[1] a Volume is equivalent to a file stored on disk, but equally applies to files stored on tape volumes, which is where the name originated. We normally speak of an archive volume, which is either a disk file with a specific name or a tape cartridge containing a specific label (name). In methods described herein, we will speak of the Metadata Volume and the Aligned Volume, which are two paired volumes that comprise an archive volume. Using the term volume or archive avoids confusion with the original client files.
8. Metadata: is data concerning a file that is generally stored by the Operating System as an ordered series of bytes, but which defines the properties of the file such as the filename, the file size, the location of the file on disk, the access permissions for the file. Metadata is normally read, written, and stored separately from the file data by the Operating System.
9. Header data: refers to data that generally precedes a block, chunk or a record that gives information about the type of data that follows, the size of the data, and possibly the address of such data. Typically header data is inserted by the archive program while reading data to be backed up and breaking it down into chunks or records to later be reconstituted into blocks that are placed in the archive volume. Some authors use the term metadata to refer to both metadata and header data. However herein, the metadata and header data as defined are always distinct.
10. Aligned data: refers to file data, containing no metadata and no header data, that is put into the paired but separate Aligned Volume.
11. Pointer:[13] refers to an item that points to a disk or memory address.

12. Reference: refers to a pointer, usually a disk or memory address that points to a block or chunk of data. Herein references point to aligned data in the Aligned Volume.
13. Deduplication: the removal of multiple instances of the same data, generally a block or chunk, that is replaced by a reference to a single copy of the block or chunk.
14. User Option: a means for users to configure how certain details of a method operates. There are generally many options that may be specified by modifying a configuration file or using a graphical interface to select variables, to set check boxes, or specify parameters that determine the details of the functioning of a method or algorithm. User Options are essential to this invention to allow the user to customize the universal deduplication file format to work optimally with various deduplication engines.
15. Padding:[10,17] refers to the process of partially or fully filling a non-full block with zeros to pad the block either to some padding size or to the end of the block.
16. Alignment:[3,15,17,18] refers to the process of ensuring that a block is written to a disk address that is some multiple of the underlying Operating System disk blocking scheme. It is always some power of two, generally 512 bytes, or 4096 bytes, and sometimes greater. Alignment can also be applied to data that resides in a computer memory. The techniques for aligning disk and memory are the same but have different alignment factors.
17. Sparse file:[8] when a file or a volume is written, it is written in blocks as described above. In doing so it is possible to skip certain block addresses by advancing the write address and thus leaving a hole in a file that is not written. A file may have multiple holes, and is typically called a sparse file. The blocks that are not written return a block of zeros if they are read, but those blocks do not exist on disk, so they occupy no disk space.
18. Serialization:[6,11] is a process of ensuring that data is written in a sequence that is independent of machine architecture. This applies particularly to header data which may consist of pointers, and 4 or 8 byte variables that can be directly fetched from computer memory. However, various architectures such as RISC, and Intel have different orders of storing the bytes that consist of a 4 or 8 byte variable. These are generally called big-endian and little-endian architectures. If an archive file is written such that it contains headers or metadata that are not properly serialized, such a file will not be portable to Operating Systems of different architectures. Portable archive files are critical for any archive program.
19. Metadata Volume:[16] the archive volume containing only metadata, headers, and references, and small data blocks.
20. Aligned Volume: an archive volume that contains only aligned file data and it is paired with a specific Metadata Volume. An Aligned Volume contains no metadata, headers, or references.

Prior Art:

All the following are considered prior art, have been commonly used and are well known to anyone familiar with the art:

1. Memory alignment:[6,17,18] It is well known by those familiar with the art that memory accesses of more than one byte must be aligned. On some system architectures, e.g., RISC, a nonaligned reference to memory will cause a "bus" error, and the program will fail. On other architectures references to nonaligned memory will not fail but will be slower than if the references were aligned. This is well known since the very first computers.
2. File block alignment:[15] When blocks are written to disk, it is well known that if they are not written at aligned disk addresses, usually a multiple of 512, but sometimes 4096, the write may fail or might result in the Operating System performing a read followed by two writes. Thus archive programs usually take care to align blocks of data to be written to disk to the appropriate blocking factor used on the underlying file system.
3. Disk block sizes:[9] At a low level all disk read and writes are done in disk block sizes typically called a sector. Often the underlying disk hardware does not permit individual reads or writes that are not disk block sizes. This size is often 512 bytes or 4096 bytes. These disk block sizes are what require the alignment of files.
4. Sparse file:[8] A sparse file is a file that has holes or blocks that have never been written. Blocks not written will use no space on the disk and will generally return all zeros if read. See FIG. 5.
5. Deduplication: Deduplication is now a well known science and much of the original research is in the public domain, while much of the current research involves sophisticated techniques that are now patented. This invention relates to deduplication, but does not have any deduplication methods directly embodied in it. Reference is made to FIG. 6. Rather the invention aligns the data in a format that enables all current and future deduplication methods to be more efficient in their application.
6. Separation of metadata and file data: Separation of metadata and file data is well known and generally the norm. On most Operating Systems, file data and metadata are stored separately on different parts of the disk (one could arguably say in different files). Two examples are Unix/Linux filesystems where the filed data is read and written with read and write system calls to disk, while metadata is obtained with special Operating System calls such as stat. Another example is Mac OSX systems where a file is stored separately as file data and a resource fork.
7. Filters: It is well known to those familiar with deduplication techniques that certain deduplication programs have algorithms that specifically filter metadata and header data from archive volumes to access the file data for deduplication. These filters must be written specifically for each vendor's archive volume format and for each version of that vendor's archive volume format that changes. This represents enormous challenges for writing deduplication programs because often the archive volume formats are proprietary and thus the deduplication programmers must either have access to proprietary information or be able to reverse engineer the volume formats to write specific filters for them. An example is Patent No. 20090192789 A1 7/2009 listed above.
8. Application specific data archive:[4,5] It is well known that backing up application data must often be application specific. For example, there are multiple SQL database programs. When backing them up the archive programmer must be aware of the application specific requirements of each program such as which files to archive, the internal structure of some of those files, etc. This is because application data such as SQL database files contain not only user but also header and metadata. Thus it is well known and common that vendors must often be familiar with the structure of such database files.

9. Serialize:[11] Writing data in an architecture independent manner. When writing an archive volume, an archive vendor must take care to write volumes using well know serialization techniques so that the data can be restored to any different system architecture and also so that the archive data itself can be read on a machine with any architecture. Not doing so, ties the vendor to a specific Operating System on a specific hardware architecture and thus seriously reduces the usability of the archive program.

Description:

The description that follows references figures which help explain certain embodiments of the invention. However, these figures and the description are not intended to be exhaustive as there are other embodiments that lie within the scope of this invention.

The embodiment described herein produces a Universal Deduplication Volume where archive data is stored in a deduplication efficient format which permits any deduplicating storage device or software to function with both the original files and their (normally modified) archived versions, removing many of today's barriers to efficient deduplication which are typically overcome with vendor specific solutions. The invention takes advantage of having a separate deduplicating filesystem or storage device on which or in which the Universal Deduplication Volume is stored. This embodiment writes the archive data to two paired files: one containing the metadata and header information, and the second containing the file data aligned in a very specific manner that will be explained below. It should be noted that if the data file is simply a stream of bytes with little or no alignment and with no configuration specific to or for the underlying deduplication engine, the data will not be efficiently deduplicated. This embodiment meticulously positions the file data in the aligned data volume according to the methods described herein yielding deduplication results that are optimal.

FIG. 1 illustrates a block overview of the computing environment in which this embodiment functions. A main component is a Server 100 which contains a Storage Module 110 wherein the methods embodying this invention are implemented. The Server 100 is connected usually via a network to a number varying from 1 to several thousand Client Computers 160 each containing an archive File module 170. These Client Computers 160 . . . can be of many varieties (Linux, Windows, Solaris, HP/UX, AIX, Mac OS, FreeBSD, . . . ). The data to be backed up (metadata and file data) resides on these Client Computers 160 and during the archive process the data is simultaneously sent by these Clients 160 as input to the Storage Module 110. Typically there is a limit of between 50 to 100 simultaneously connections depending on the available bandwidth of the network connection and the sizing of the Server 100.

The Server 100 may have a multitude of resident Filesystems 120, which are deduplication capable, with their Local Disk Storage 130. The Server 100 may also be attached to a multitude of Storage Systems 140, deduplication capable, with their own Local disk Storage 150. After transformation of the input data mentioned above by the Storage Module 110 according to the methods of this invention, the metadata and aligned data files wilt be written on one or more of these Filesystems 120 or Storage Systems 140.

In addition to separating the incoming metadata and file data records or streams into two separate files (Metadata Volume and Aligned Volume), the Storage Module 110 inserts headers and references into the metadata stream that permit finding the Aligned Volume data for restoration, and more importantly, the Storage Module 110 assures that the aligned data file is properly blocked and aligned for optimal deduplication. There are a number methods that it must apply to achieve this optimal deduplication. As previously mentioned, if the output stream in the data volume is not properly aligned as is the case in patent U.S. Pat. No. 8,055,681 B2 cited above, the deduplication will be far from optimal.

Figure 2:
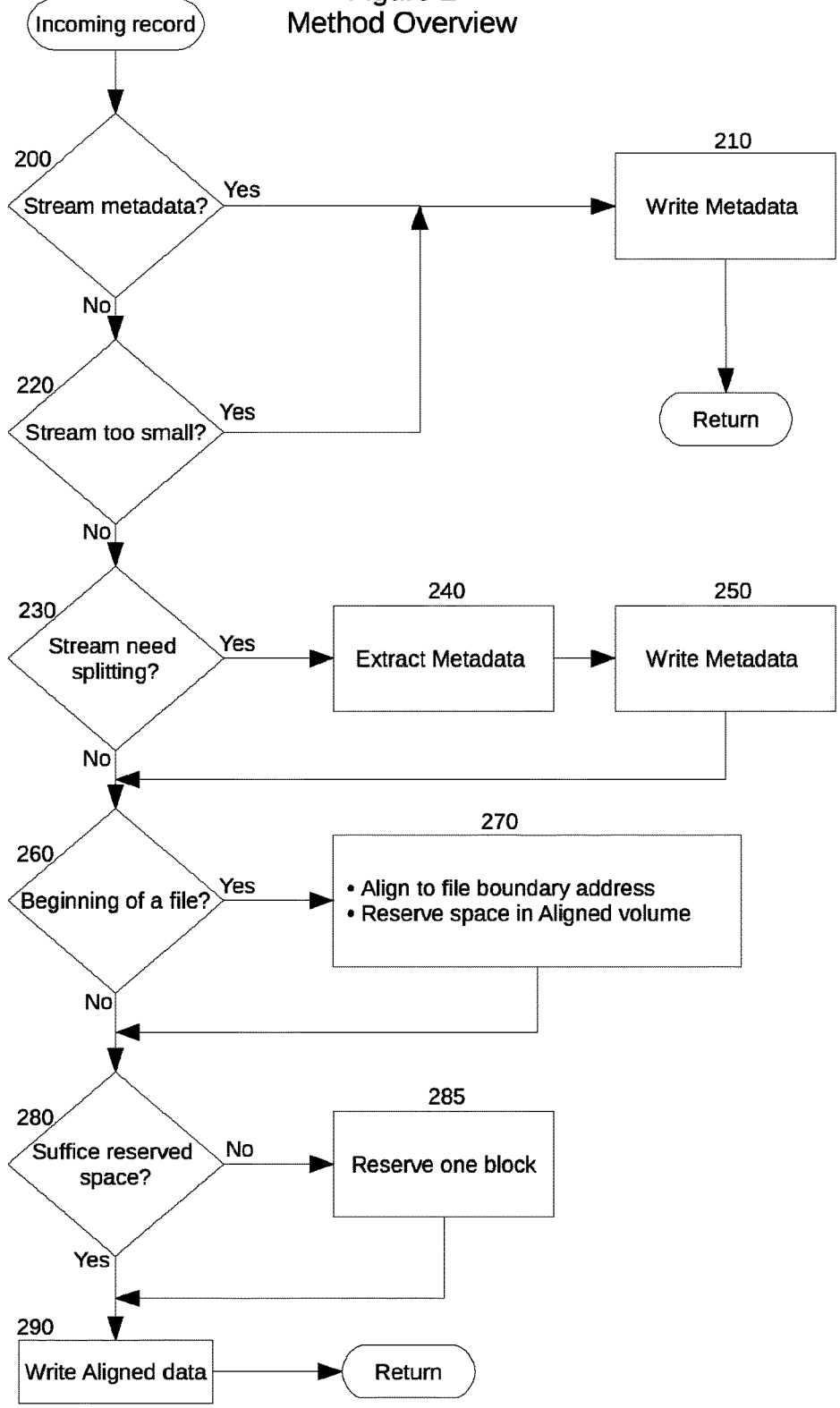
FIG. 2 illustrates an overview of a method according to an example of the invention.

FIG. 2 presents a flow chart of the overview of the method. An incoming client record from block 160 of FIG. 1 is examined to determine whether it is metadata in test 200, and if so, it is passed to the Write metadata 210 function. Block 210 writes a serialized metadata record to the Metadata Volume and returns to get the next incoming record. If the record is not metadata, the file size is tested against the User Option minimal aligned file size in test 220 to see if it should be put in the Metadata Volume. The size is a User Option tunable for each underlying deduplication engine, because experience shows that very small files (generally less than 4096 bytes) do not deduplicate well. Test 230 determines if the incoming record type (stream) is composed of both metadata and file data. This can be the case for certain Clients such as Windows when the operating system call BackupRead is made, unlike most other Operating Systems, BackupRead returns a stream of bytes containing both metadata and file data. If the incoming stream contains metadata, it is passed to a metadata extraction routine 240, which is specific to each input type, which then passes the metadata to the Write Metadata routine 250, which as in the case of block 210, writes the record in serialized format to the Metadata Volume, and then passes the remaining file data to test 260, which determines if this is the beginning of a new client file. If so the control passes to routine 270 where the Aligned Volume address is aligned to a File boundary (User option) and the necessary space to hold the aligned data is reserved in the Aligned Volume. Either after routine 270 completes or if the test 260 does not find a new client file, control passes to test 280 to determine if there is sufficient space reserved in the Aligned Volume to write the record. Only in the case that the file being archived has increased in size since the beginning of reading the file, will the test fail and a new block will be reserved in 285 for the record. In either case, the control passes to the Write Aligned Data routine 290, which writes the aligned data to the aligned buffer.

Figure 3:
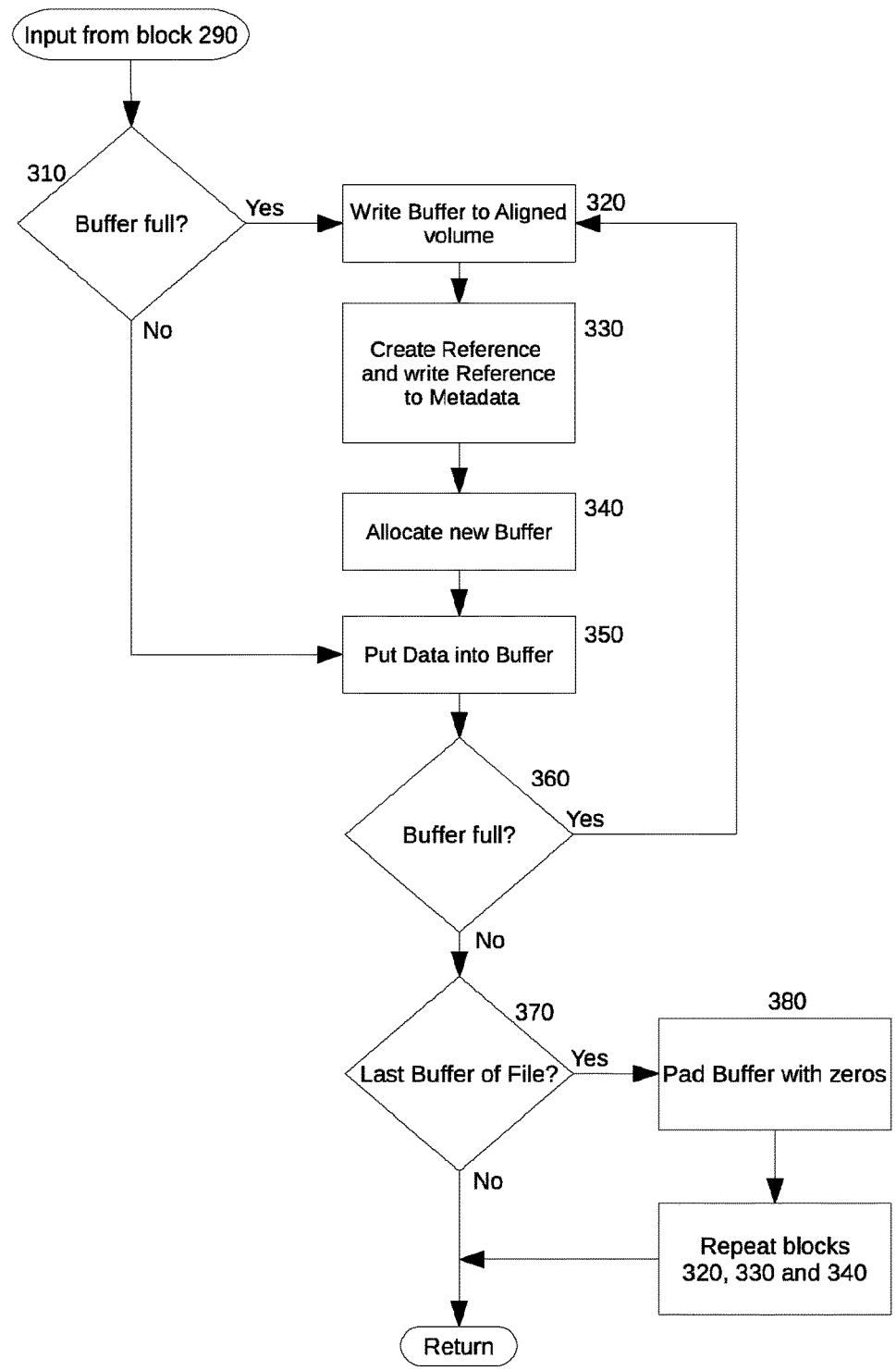
FIG. 3 illustrates details of a Write Aligned Data method according to the invention.

FIG. 3 indicates the details of the Write Aligned data block 290 shown in FIG. 2. It begins with a test 310 to determine if the current aligned block buffer is full. If so, control is passed to routine Write Buffer 320 (block 320 is discussed in detail in FIG. 4 below), and a reference 330 to the aligned data block is created in a serialized format and sent to the Write Metadata routine. By putting the reference to the file data in the Metadata Volume, we accomplish two things: we avoid mixing any archive specific control data with the file data; and during subsequent reading of the metadata stream to perform a restore, the aligned data is immediately found by following the reference. Following writing the reference a new buffer is allocated in block 340.

In all cases, the control passes to the put data in the buffer routine 350 and subsequently to an additional test to see if the buffer is now full 360. If so control returns to the block 320 where the aligned buffer is flushed and so on and more data is written to an aligned block. After writing all of the record and test 360 determines that the buffer is no longer full, control passes to test 370 which determines if this is the last buffer of the file, and if so, control passes to the pad buffer with zeros routine 380, where the buffer is padded with zeros according to the User Option for padding. On many modern Operating Systems, the underlying system records the exact position data was last written, and in this case, no padding is needed, on other systems, only the last block address is recorded, in which case the last block is filled or padded with zeros to avoid blocks with the same information appearing to be different due to garbage or random bytes in the last block. If this was the last block and padding was done in routine 380, the buffer is flushed 320, a reference written 330, and a new buffer allocated 340. Then the write aligned data routine returns.

Figure 4:
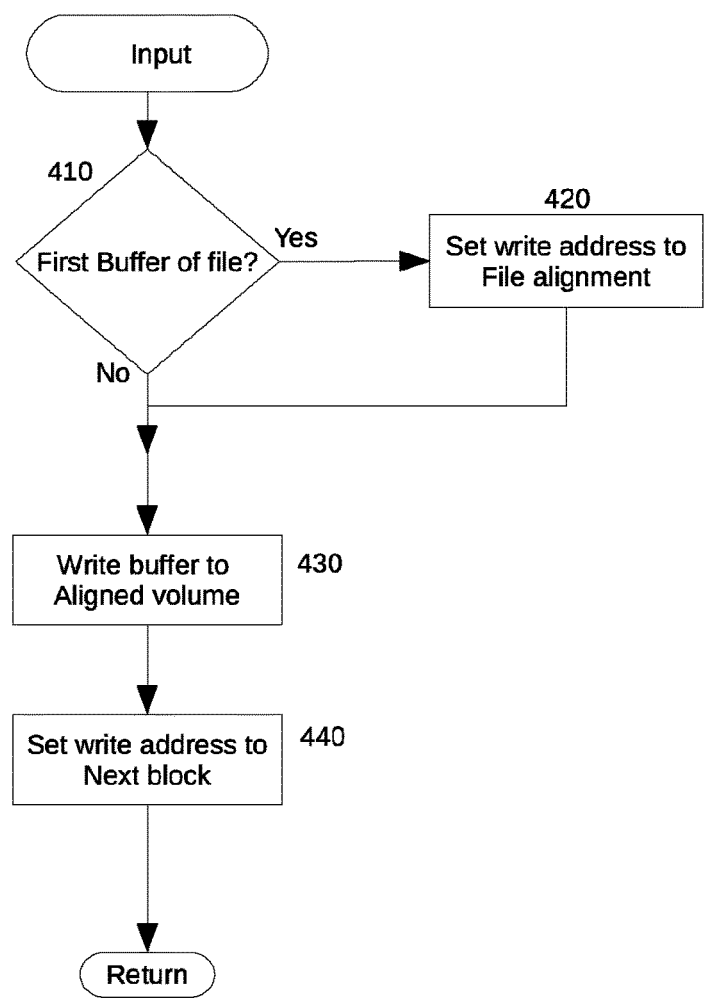
FIG. 4 illustrates details of a Write Buffer to Aligned Volume method according to the invention.

FIG. 4 indicates the details of writing a buffer to the Aligned Volume. Test 410 determines if this is the first buffer of a client file, and if so gives control to block 420, which sets the buffer write address to the next start of file address as defined by the User Option for File Alignment. The aligned address is computed using integer arithmetic with the formula:

$$AlignedAddress=((CurrentAddress+FileAlignment-1)/FileAlignment)*FileAlignment$$

Since the addresses are always a power of two, this calculation could also be done using binary arithmetic. Control subsequently passes to the Write Aligned volume in block 430 then the next block write address is properly set in block 440.

Figure 5:
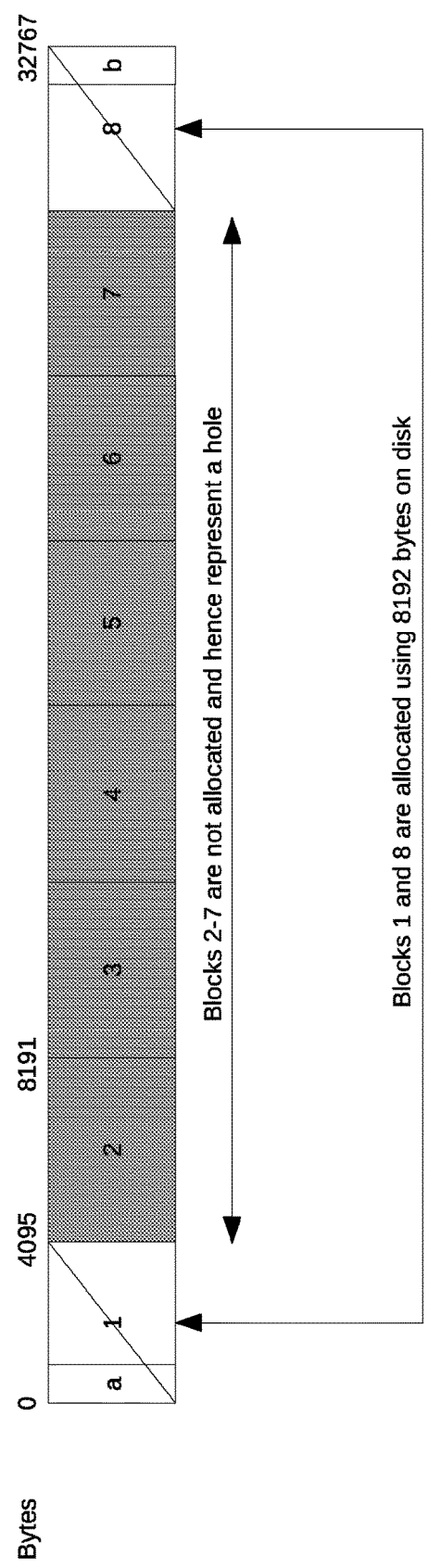
FIG. 5 illustrates a Sparse file according to the invention.
Figure 6:
FIG. 6 shows an Empty Disk Filesystem and a Filesystem with files.
Figure 6:
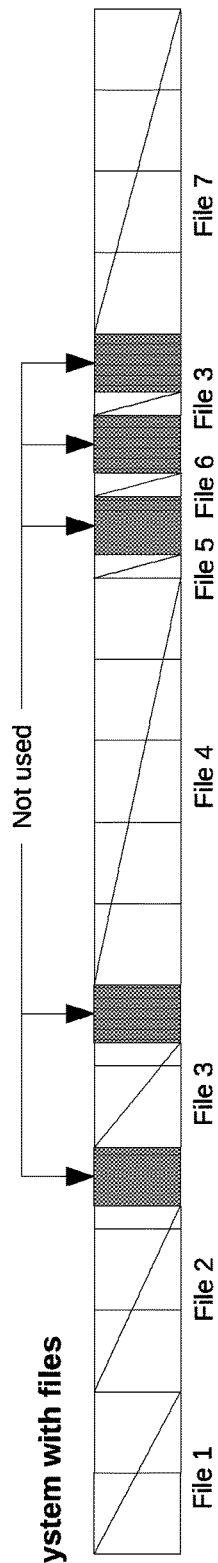

FIG. 5 depicts a Sparse File.[8] Sparse files have blocks within the address range of the file that are not actually allocated by the operating system. The invention described herein uses this feature of all modern operating systems to create an archive volume that deduplicates optimally.

FIG. 6 depicts an empty filesystem and a filesystem with files. Items to note: there are blocks that are unused and hence not allocated, and files such as File 3 can be split into several blocks that reside on different places of the filesystem. This figure is not to scale.

FIG. 7 depicts a Traditional Archive Volume as well as the Metadata and Aligned Volumes described herein. The Traditional Volume has all files packed together and interspersed with headers and metadata. As noted above, this kind of archive file either cannot be deduplicated or is deduplicated only by deduplication programs that are able to identify all the headers and the metadata, something that must be done for each archive vendor's archive volume format. An actual implementation of such an archive volume is described in detail in reference 16.

Also depicted in FIG. 7, are the Metadata and Aligned Volume formats described herein. The Metadata Volume contains all the header and metadata compacted and serialized[11] in an efficient way without any alignment. In contrast the files are written to the Aligned Volume with the first block of the file aligned at a File Alignment address which may create an unallocated block or blocks preceding certain files such as shown for files 3, 5, and 6 in the figure. The end of each file also may have a Padding Size to fill the last unfilled block (or partial block) with zeros. A padded block will thus be allocated, but any additional blocks between the end of the padded block and the beginning of the next block that is the beginning of a new client file will be unallocated. These methods plus a careful choice of the Block Size, creates an archive volume that can be optimally deduplicated.

User Options

Above User Options were mentioned. What follows are some examples that have proved useful in a real embodiment:

For the filesystems ZFS, lessfs, and ddumbfs, the following values produce excellent results:
  Block Size=128K
  File Alignment=128K
  Padding Size=512
  Minimum Aligned Size=4096

For NetApp filesystems, the following are preferable:
  Block Size=64K
  File Alignment=4K
  Padding Size=4K
  Minimum Aligned Size=4K Where the values are shown at right after the equal sign, and the K means to multiply by 1024 bytes.

Block Size is the size of blocks to be written into the Aligned Volume.

File Alignment is the alignment of the first block of each original file stored in the Aligned Volume.

Padding Size is the alignment to which the last block of an original file is filled with zeros if it is not full.

Minimum Aligned Size is the file size below which the file will be placed in the Metadata Volume rather than the Aligned Volume.

Additional User Options not shown above are the placement of the Metadata and Aligned Volumes on the filesystem; the selection of which file data streams to put into the Aligned Volume; additional specific processing of specific streams particularly application data streams. This list of User Options is not meant to be exhaustive nor to limit the possible embodiments of the invention.

Reconstruction of the Original Files

Reconstruction of the original files is very simple. The method consists of reading the Metadata Volume one record at a time and returning it. If the record is a reference, the referenced data is read from the Aligned Volume and returned. There are no other special techniques required other than knowing the exact format of the metadata file. An example of an implementation of a metadata file is shown in reference 16.

In a working embodiment, several of the blocks shown in the Figures and explained in the above example would be a single routine that can be used in several places rather than being separate, duplicate logic blocks.

In a working embodiment there are a number of additional considerations that are not discussed here since they are well known to those familiar with the art and the precise use of such techniques depend on the details of the embodiment. A non-exhaustive list follows:

1. methods for serially sequencing multiplexing steams (mutual exclusion[2], locking);
2. separate context for each multiplexed streams so that buffers and variables are dependent on the context;
3. methods such as threads[2] or separate processes and shared memory for accomplishing multiplexing and buffering;
4. a separate context for each device or volume pair being written as one can write multiple volumes simultaneously;

5. provisions for creating new volumes when one or both of the volumes are full or reach a predetermined size set by a User Option;
6. methods for allocating space within a volume when multiplexing.

The embodiments described herein are given as examples and are not intended to be exhaustive nor to limit possible embodiments of the invention. There exist many variations and modifications of the above examples that are possible within the scope of this invention. Additional embodiments are possible and may be contained within the claims herein made or in any other claims subsequently filed. For example, it is not essential that the metadata and aligned data be placed in separate volumes since by following the alignment methods specified herein they may both be contained in a single Aligned Volume.

Embodiments may be implemented entirely in hardware or entirely in software or in a combination of hardware and software. Software embodiments include but are not limited to computer software, firmware, and microcode.

The operations in the above example are arranged in a specific order. In alternative embodiments, these operations may be operated in sequentially, parallel or distributed manner, arranged in a different order, modified or in some cases removed. In addition, additional operations may be added to the above example and stilt conform to this invention.

The example describes a disk based volume format, but the methods described herein also apply to any information storage media whether software or hardware.

REFERENCES

1. Coughlin Associates: Aligning with the Future of Storage
2. David R. Butenhof, "Programming with POSIX Threads, Addison-Wesley, 1997
3. Conlad Lewine, "POSIX Programmer's Guide", O'Reilly & Associates, Inc. 1991
4. W. Curtis Preston, "Backup and Recovery", O'Reilly, 2007
5. W. Curtis Preston, "Unix Backup and Recovery", O'Reilly, 1999
6. Gary V. Vaughan, et al., "GNU Autoconf, Automake, and Libtool, New Riders, 2001
7. Dorian J. Cougias, et al., "the Backup Book", New Frontiers, LLC 2003
8. http://www.wikipedia.com/wiki/Sparse_file
9. http://www.wikipedia.com/wiki/Hard_disk_drive
10. http://www.wikipedia.com/wiki/Block_cipher#Padding
11. http://www.wikipedia.com/wiki/Serialization
12. http://www.wikipedia.com/wiki/Metadata
13. http://www.wikipedia.com/wiki/Pointer_(computer_programming)
14. http://www.wikipedia.com/wiki/Multiplexing
15. http://www.wikipedia.com/wiki/Advanced_Format#4kn
16. http://www.bacula.org/5.2.x-manuals/en/developers/developers/Storage_Media_Output_Format.html
17. http://en.wikipedia.org/wiki/Data_padding#Data_structure_padding
18. http://www.ibm.com/developerworks/library/pa-dalign/

The invention claimed is:

1. A method for creating a universal deduplication volume that includes data from multiple files, the multiple files able to be deduplicated by a deduplication storage system, the method comprising the steps of:

receiving data of the multiple files including metadata and file data, at least a part of the metadata and file data are already separated, separating the metadata and the file data into a first file and a second file, respectively, the first file and the second file being paired, the first file being an archive volume including a metadata volume having metadata, header data, and references to the file data, and the second file being the universal deduplication volume including file data, aligning a beginning of each one of the file data in the universal deduplication volume at a block file boundary that corresponds to a block file boundary of a corresponding original file of the file data of the multiple files, to create an aligned volume aligned with the multiple files for the universal deduplication volume, and leaving an empty space between an end of each one of original files of the file data and at a beginning of a subsequent original file of the file data, to create unallocated storage space in the aligned volume, wherein the step of aligning ensures that a block is written to an address that is a multiple of a disk blocking scheme of the file format of the deduplication storage system.

2. The method of claim 1, further comprising the step of: writing the file data in the aligned volume in block sizes as set by a user option of the duplication storage system.

3. The method of claim 1, further comprising the step of: padding incomplete blocks, which occur at an end of an original file of the file data, with zeros as set by a user option of the deduplication storage system.

4. The method of claim 1, further comprising a step of: placing small files as determined by a user option of the deduplication storage system in the metadata volume.

5. The method of claim 1, further comprising the step of: pairing the metadata volume and the aligned volume to obtain a logically same single archive volume.

6. The method of claim 5, further comprising the step of: writing the metadata into the aligned volume of the original stream; and providing references to any subsequent metadata, thereby enabling use of a single volume.

7. The method of claim 1, further comprising the step of: providing a user option corresponding to a location where the metadata volume is created.

8. The method of claim 1, further comprising the step of: providing a user option corresponding to a location where the aligned volume is created.

9. The method of claim 1, further comprising the steps of: reconstructing original data from the multiple files by reading the metadata volume;

returning metadata when metadata is encountered; and
reading and returning the original data or record from the aligned volume when a reference is found.

10. The method of claim 1, further comprising a step of: separating additional metadata that is included in the file data from the file data, and writing the additional metadata to the first file, depending on a type of the received data records.

11. The method of claim 1, wherein the step of aligning the beginning of each one of the file data in the universal deduplication volume is based on a file format set by a user option of the deduplication storage system for accessing the universal deduplication volume.

12. A system comprising a computer for performing a method for creating a universal deduplication volume that includes data from multiple files, the multiple files able to be deduplicated by a deduplication storage system, the method comprising the steps of:

receiving data of the multiple files including metadata and file data, at least a part of the metadata and file data are already separated, separating the metadata and the file data into a first file and a second file, respectively, the first file and the second file being paired, the first file being an archive volume including a metadata volume having metadata, header data, and references to the file data, and the second file being the universal deduplication volume including file data, aligning a beginning of each one of the file data in the universal deduplication volume at a block file boundary that corresponds to a block file boundary of a corresponding original file of the file data of the multiple files, to create an aligned volume aligned with the multiple files for the universal deduplication volume, and leaving an empty space between an end of each one of original files of the file data and at a beginning of a subsequent original file of the file data, to create unallocated storage space in the aligned volume, wherein the step of aligning ensures that a block is written to an address that is a multiple of a disk blocking scheme of the file format of the deduplication storage system.

13. The system of claim 12, wherein the method further comprises a step of: separating additional metadata that is included in the file data from the file data, and writing the additional metadata to the first file, depending on a type of the received data records.

14. The system of claim 12, wherein the step of aligning the beginning of each one of the file data in the universal deduplication volume is based on a file format set by a user option of the deduplication storage system for accessing the universal deduplication volume.

15. A storage medium having computer software code recorded thereon, the software code configured to perform a method when executed on a computer, the method configured to create a universal deduplication volume that includes data from multiple files, the multiple files able to be deduplicated by a deduplication storage system, the method comprising the steps of:

receiving data of the multiple files including metadata and file data, at least a part of the metadata and file data are already separated, separating the metadata and the file data into a first file and a second file, respectively, the first file and the second file being paired, the first file being an archive volume including a metadata volume having metadata, header data, and references to the file data, and the second file being the universal deduplication volume including file data, aligning a beginning of each one of the file data in the universal deduplication volume at a block file boundary that corresponds to a block file boundary of a corresponding original file of the file data of the multiple files, to create an aligned volume aligned with the multiple files for the universal deduplication volume, and leaving an empty space between an end of each one of original files of the file data and at a beginning of a subsequent original file of the file data, to create unallocated storage space in the aligned volume, wherein the step of aligning ensures that a block is written to an address that is a multiple of a disk blocking scheme of the file format of the deduplication storage system.

16. The storage medium of claim 15, wherein the method further comprises a step of: separating additional metadata that is included in the file data from the file data, and writing the additional metadata to the first file, depending on a type of the received data records.

17. The storage medium of claim 15, wherein the step of aligning the beginning of each one of the file data in the universal deduplication volume is based on a file format set by a user option of the deduplication storage system for accessing the universal deduplication volume.

* * * * *